United States Patent

Serota et al.

[15] 3,666,781
[45] May 30, 1972

[54] PROCESS FOR THE PREPARATION OF ISOPROPENYL STEARATE

[72] Inventors: Samuel Serota; Edward S. Rothman, both of Philadelphia, Pa.

[73] Assignee: The United States of America as represented by the Secretary of Agriculture

[22] Filed: May 7, 1969

[21] Appl. No.: 822,693

[52] U.S. Cl. .................................................260/410.9 N
[51] Int. Cl. ....................................................C07c 67/04
[58] Field of Search ...............260/410.9 N, 410.9 R, 498

[56] References Cited

UNITED STATES PATENTS 2,066,075  12/1936  Reppe...............................260/410.9
3,135,784  6/1964  Feder................................260/476

FOREIGN PATENTS OR APPLICATIONS 945,028  12/1963  Great Britain.....................260/498

OTHER PUBLICATIONS

J. Am. Oil Chemists Soc., 45 (3) 189– 3, 3/68

Primary Examiner—Lewis Gotts
Assistant Examiner—Diana G. Rivers
Attorney—R. Hoffman and W. Bier

[57] ABSTRACT

Stearic acid undergoes direct addition of propyne at 160° C. in the presence of zinc stearate catalyst in an inert atmosphere at a pressure of 500 pounds per square inch to form isopropenyl stearate.

3 Claims, No Drawings

PROCESS FOR THE PREPARATION OF ISOPROPENYL STEARATE

A non-exclusive, irrevocable, royalty-free license in the invention herein described, throughout the world for all purposes of the United States Government, with the power to grant sublicenses for such purposes, is hereby granted to the Government of the United States of America.

This invention relates to a novel preparation of the enol ester isopropenyl stearate. More particularly, it relates to the preparation of isopropenyl stearate by the direct addition of stearic acid to methyl acetylene (propyne) under moderate conditions of pressure using zinc stearate catalyst. Heretofore, isopropenyl stearate has been prepared by an ester-acid interchange procedure as described in J. Org. Chem. 27, 3123–27, 1962 or by direct addition as described in J.A.O.C.S. 45, 189–193, 1968. As can be seen in the references, both procedures require a number of tedious steps.

An object of this invention is to provide a simple direct improved process for the preparation of isopropenyl stearate.

According to this invention, isopropenyl stearate is prepared by reacting stearic acid and methyl acetylene (propyne) in the presence of zinc stearate catalyst in an inert atmosphere such as nitrogen at a pressure of about 500 pounds per square inch and at a temperature of about 160° C. for 4 to 16 hours.

Isopropenyl stearate is an important reagent for introducing the stearoyl group into a wide variety of products such as medicinals, lubricants, and fine chemical preparations (J.A.O.C.S. 45, 189–193, 1968). It has the desirable advantages of high reactivity, favorable, usually quantitative yields, and purity of crude product uncontaminated by masses of by-products like stearic acid, pyridine salts, or methanolic sodium methoxide as in the case when the classical reagents stearic anhydride, stearoyl chloride and methyl stearate are used. Isopropenyl stearate generates gaseous acetone as the sole by-product leaving a relatively uncontaminated, high purity crude product. In addition, since the reaction product acetone is an expelled gas, the reactions typically go to completion. The evolution of gaseous acetone tends to drive the reaction to completion and acylation occurs even in many unfavorable cases.

A careful distinction must be made between isopropenyl stearate and the similar sounding but completely different compound isopropyl stearate. Thus, isopropenyl stearate is effective in introducing the stearoyl group into an amide as for example in the conversion of N-butylstearamide to N-butyl distearamide (J. Org. Chem 29, 646–650, 1964). In this conversion, isopropyl stearate is totally ineffective. The closely related vinyl homolog, vinyl stearate, is also totally ineffective as a stearoyl group carrier (J. Org. Chem 29, 646–650, 1964). Therefore, it is necessary to treat isopropyl, isopropenyl and vinyl esters as totally dissimilar compound types even though formally they fit into the classification of homolog types. The anomalous properties of the vinyl esters relative to ordinary esters have been pointed out by Adelman (J. Org. Chem. 14, 1057–1077, 1949) who found the interchange reaction of vinyl esters to be distinctly different in nature from ordinary transesterifications or ester-acid interchanges.

In addition to the behavioral differences between isopropenyl and vinyl esters, the reactions of formation of these esters show very sharp demarcations. For example, vinyl acetate requires mercury catalyst to exchange with stearic acid to form vinyl stearate whereas isopropenyl acetate does not require the mercury catalyst to react.

In view of the foregoing facts, it should be evident to one skilled in the art that the reaction of methyl acetylene (propyne) and stearic acid could not be predicted in advance as to degree or identity of products.

A critical element for the success of the process of this invention is the fact that the zinc stearate catalyst forms a homogeneous liquid melt with stearic acid thus providing a medium which dissolves appreciable amounts of propyne. The propyne can be introduced into the apparatus ab initio in batch operations or fed into excess melted stearic acid-zinc stearate in continuous operations. Nitrogen under pressure is used to force the propyne into greater solution in the liquid phase as well as to obtain chemical equilibrium. The nitrogen also dilutes the propyne molecules thereby keeping them well spaced apart and preventing explosive detonations.

The process of this invention is illustrated in the following example:

A charge of 50 gm of stearic acid (97–98 percent pure) and 1.0 gm of zinc stearate was placed in a pressure autoclave and converted to a homogeneous melt. The vessel was well-flushed with nitrogen and then by means of a pressure burette 3 equivalents of propyne were added as a liquid (low temperature), the transfer being effected by a pressure of nitrogen which eventually was raised to 500 pounds per square inch. The temperature in the autoclave was raised to 160° C. and held at this level for 5 hours after which the autoclave was allowed to cool overnight before opening. Analysis of the product of the reaction showed that it was 95 percent isopropenyl stearate, 5 percent stearic anhydride and a trace of unreacted stearic acid. The catalyst was unaffected and in reusable condition. Formation of metallic zinc was not observed under the above conditions.

Although relatively pure stearic acid was used in the above example, commercial "cold-pressed" stearic acid (a mixture of about 40 percent stearic acid and 60 percent palmitic acid) and other similar mixtures of fatty acids from saponified vegetable and animal fats and oils are also operable in the process of this invention.

We claim:

1. A process for the preparation of isopropenyl stearate comprising reacting stearic acid and methyl acetylene (propyne) in the presence of zinc stearate catalyst in an inert atmosphere such as nitrogen at a pressure of about 500 pounds per square inch and at a temperature of about 160° C. for from 4 to 16 hours.

2. The process of claim 1 in which a mixture of fatty acids derived from saponified vegetable oils is used in place of stearic acid.

3. The process of claim 1 in which a mixture of fatty acids derived from saponified animal oils is used in place of stearic acid.

* * * * *